Nov. 12, 1968  C. ROSAIN ET AL  3,411,026
BALANCED LOW-SPEED ELECTRIC MOTOR
Filed May 31, 1966  4 Sheets-Sheet 1

Nov. 12, 1968  C. ROSAIN ET AL  3,411,026
BALANCED LOW-SPEED ELECTRIC MOTOR
Filed May 31, 1966  4 Sheets-Sheet 4

United States Patent Office 3,411,026
Patented Nov. 12, 1968

3,411,026
BALANCED LOW-SPEED ELECTRIC MOTOR
Claude Rosain, 50 Rue Raynouard, Paris 16eme, France, and Georges Stcherbatcheff, 29 Ave. la Bourdonnais, Paris 7eme, France
Filed May 31, 1966, Ser. No. 553,859
Claims priority, application France, June 9, 1965, 20,016
8 Claims. (Cl. 310—82)

This invention relates to low-speed electric motor of the general type comprising an armature which is essentially formed of a permanent magnet and pole-pieces, an inductor which is designed to generate a rotating field within an air-gap located opposite to said pole-pieces, at least one roller track associated with wheels which are rigidly fixed to the inductor and/or the armature, coupling members for providing a coupling between the inductor and/or the armature and a support frame, and a motion-transmission system which serves to deliver to an output shaft a movement of rotation having an angular velocity which is low with respect to the angular velocity of the rotating field.

A particular motor of this type is disclosed in the U.S. Patent No. 3,117,244, filed by the same applicant, for "Alternating Current Motors," and patented Jan. 7, 1964.

Prior motors of this general type usually do not have a good dynamic balance, which may be a drawback in some applications.

It is an object of the present invention to provide a low-speed electric motor of the type above referred to, which has a particularly good dynamic balance, yet possessing the usual advantages of that type of motor.

In the motor according to this invention, there is associated with each wheel which is rigidly fixed to the armature, either one wheel or a face of one wheel which is rigidly fixed to the inductor, the wheel pair thus formed being free to perform respective circular translational movements of small amplitude and in opposite-phase relationship, whilst the rotational movement of said wheels is arrested by stabilizing members and thus produces a torque which drives a corresponding roller track, said motion-transmission system being directly constituted by said roller track or tracks which are rigidly fixed to the output shaft.

The wheels of the armature and of the inductor which are associated with the same roller track have substantially the same diameter and the same mass (or diameters and masses in suitable ratio) and consequently achieve the dynamic balance of the motor as a result of their circular translational movements in opposite-phase relationship, which constitutes a very important advantage of the invention.

The various features and advantages of the invention will become more readily apparent from the description which now follows, references being had to the accompanying drawings, in which:

FIG. 1 is a sectional view of a motor in accordance with the invention in which the lower half of the figure is a cross-section taken along the plane of one of the sleeves which couple one wheel of the armature to the associated wheel of the field-coil unit or inductor, whilst the upper half of the figure is a cross-section taken along the plane of one of the thrust-bearings which form part of said coupling members.

Figure 1:
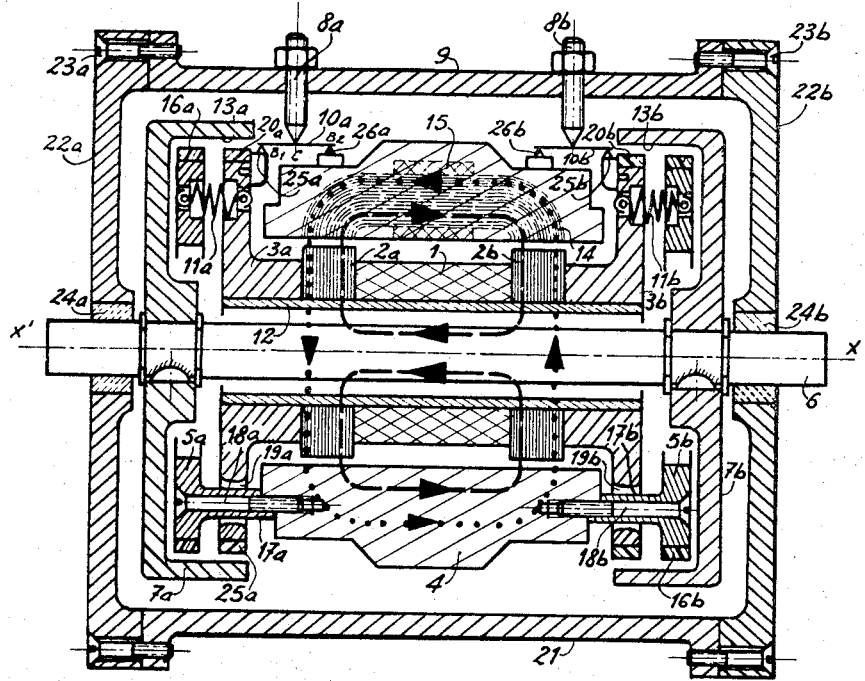

The motor which is illustrated in FIG. 1 essentially comprises:

An armature which is formed of a magnet 1, pole-pieces 2a, 2b, two wheels 3a and 3b and a cylindrical support member 12, A field-coil unit or inductor 4 which is fitted with two wheels 5a and 5b, A rigid assembly consisting of a shaft 6 on which are keyed two wheels 7a and 7b which form two roller tracks 13a and 13b for the wheels 3 and 5, A frame 9, Coupling members as described hereinafter, between the armature, the inductor and the frame, these members being designed to perform at the same time the function of stabilizing system.

In short, the inductor and the armature are urged under the action of electromagnetic forces against the roller tracks 13a and 13b and each carry out a circular movement of translation relative to the frame over an arc of small radius. Said inductor and armature are prevented from rotating by the aforesaid coupling members which provide a connection with the frame and the two forces of reaction of each roller track with respect to the inductor and armature respectively produce a torque which drives the rigid assembly in a slow movement of rotation whilst the inductor and armature each carry out a hypocycloidal movement with respect to said rigid assembly.

The two circular movements of translation carried out over an arc of small radius by the inductor and armature which have equal masses are in opposite phase, with the result that dynamic balance of the system is ensured.

A detailed description of the motor and of the operation of this latter will now be given.

The inductor 4 comprises means for producing a rotating field at an angular velocity $\omega$ equal to the angular velocity of the alternating-current supply. These means are constituted, for example, by laminated-iron cores such as the core shown in broken lines at 14 and carrying windings such as the winding shown in cross-hatchings at 15. Such windings are disposed in pairs around the armature in a multi-phase configuration. The alternating-current flux which is thus generated closes across the laminated-iron pole-pieces 2a and 2b of the armature as indicated by the dotted-line arrows.

The direct-current flux of the magnet 1 closes as shown by the broken-line arrows.

The wheels 5a and 5b which are constructed of non-magnetic material have the shape of circular rings which are fitted around their peripheries with tires 16a and 16b in order that said wheels may be permitted to run along the roller track without any slip.

As can be seen from the lower half-section of FIG. 1, the aforesaid wheels are coupled to the inductor by means of sleeves such as those designated by the references 17a, 17b, said sleeves being secured by means of screws such as 18a–18b. Said sleeves pass through corresponding bores such as 19a–19b of the wheels 3a–3b.

Provision can be made, for example, for three sleeves for each wheel 5a and 5b and it will be apparent that said sleeves are uniformly spaced about the axis of revolution $x'-x$ of the motor.

Both inductor and armature can thus have a relative displacement which is limited, for example, to a few millimeters.

The member 12 and the wheels 3a–3b of the armature are formed of non-magnetic material. The wheels, which are in the form of circular rings, are fitted with tires 20a–20b.

The frame 9 comprises a cylindrical portion 21 and two end-shields 22a–22b which are secured to the cylindrical portion by means of screws such as 23a–23b. The shaft 6 is rotatably mounted in bearings 24a–24b which are rigidly fixed to said end-shields.

The aforesaid coupling members are shown diagrammatically in the upper half-section of FIG. 1 in the form of link-arms 10a–10b, one end of which (namely the end 25a or 25b) is applied against the armature whilst the other end (namely the end 26a or 26b) is applied against the inductor, the bearing members employed being of the universal ball-bearing type, for example. A third universal ball-bearing is held by a bolt (8a or 8b) which is secured to the frame.

Tension springs such as the springs 11a–11b are each fixed at one end within a cavity which is formed within the wall of each inductor wheel whilst the other end is fixed within a cavity formed within the wall of each armature wheel.

Provision is made for a link-arm 10a bis, not shown in the drawings, which is diametrically opposite to the link-arm 10b, and for a link-arm 10b bis, not shown in the drawings, which is diametrically opposite to the link-arm 10b. Similarly, provision is made for a certain number of springs such as the spring 11a which are uniformly distributed about the axis $x'-x$, and a certain number of springs such as the spring 11b which are uniformly spaced about said axis $x'-x$.

Figure 2:
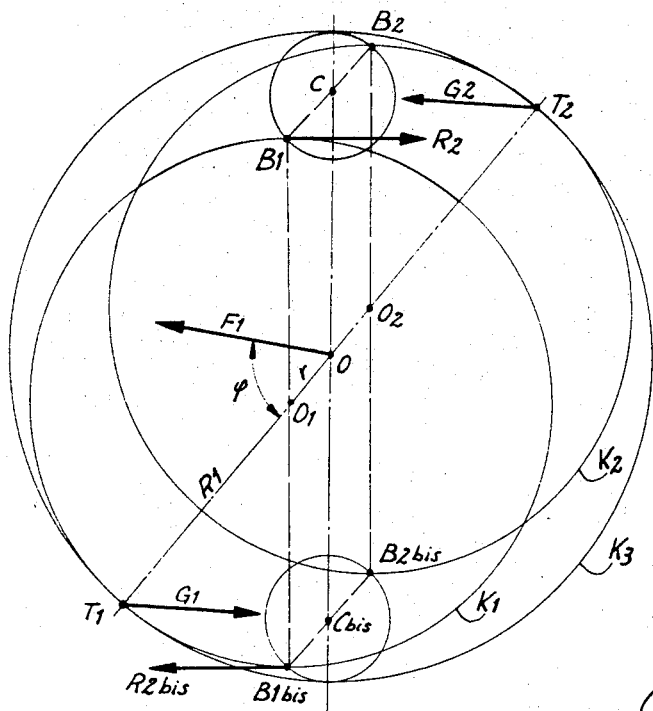
FIG. 2 illustrates the kinematics and dynamics of the system.

The operation of the motor which has just been described will now be explained in detail in reference to FIG. 2.

Consideration will first be given to the movement of one of the wheels such as the wheel 5a of the armature. There is shown in FIG. 2 the circumference $K_1$ of said wheel having a radius $R_1$ and centered at a point $O_1$ which is located at a distance $r$ from the center O of the circumference $K_3$ of the roller track. The center O is located on the axis $x'-x$; it is apparent that $r$ is the clearance between the wheel of the armature and the roller track.

It can be assumed that the resultant of the electromagnetic actions of the field winding or inductor on the armature is a rotating force $F_1$ which is centered approximately at O. In order that this should be the case, it is necessary to ensure that the magnetic circuit is suitably designed and it is also preferable to ensure that the rotating and direct-current fields have a radial distribution of revolution, particularly within the annular air-gap which is defined by a plane at right angles to the axis $x'-x$.

Under the action of this force, the armature comes into contact with the roller track at a point $T_1$ and each of its points describes at an angular velocity $\omega$ a circle having a center O and a radius $r$. The armature runs without slip on the roller track and drives this latter in rotation. The condition of rolling without slip ensures that the roller track having a radius $R_3 = R_1 + r$ has an angular velocity $\Omega$ which is defined by the relation:

$\Omega R_3$ (linear velocity of any given point of the roller track $= \omega r$ (linear velocity of any given point of the armature).

We therefore have:

$$\Omega = \frac{\omega r}{R_3}$$

The wheels 7a and 7b therefore constitute a motion-transmission system and drive the motor shaft 6 at a low angular velocity with respect to the rotational velocity of the rotating field in the ratio of the radius of the roller track to the difference in the respective radii of the roller track and the armature wheel.

It can be demonstrated that, when the motor produces a torque, the force $F_1$ has a constant phase lead by an angle $\rho$ with respect to the contact radius $OT_1$ (this angle $\rho$ depends on the torque to be supplied). This force $F_1$ is balanced by the reaction $G_1$ of the roller track on the armature which is in direct opposition to said force. $F_1$ and $G_1$ generate a torque which would have a tendency to produce a movement of rotation of the armature about the axis $x'-x$.

However, the aforesaid torque is cancelled by a torque exerted in the opposite direction by the link-arms 10a and 10a bis which correspond to the wheel 3a. It is assumed that C and C bis are the respective centers of articulation of said link-arms whilst $B_1$ and $B_2$ and $B_1$ bis are their respective extremities.

Said points $B_1$ and $B_1$ bis are located substantially at the extremities of one diameter of the wheel 3a (circle $K_1$) whilst the points $B_2$ and $B_2$ bis are located substantially at the extremities of one diameter of the corresponding wheel 5a of the inductor (circle $K_2$ having a center $O_2$ located at the distance $r$ from O).

There have been shown the circles described by the point $B_1$ or $B_2$ on the one hand and $B_1$ bis or $B_2$ bis on the other hand. It must be clearly understood that $B_1$ and $B_2$, for example, describe two separate and distinct circles which are located in planes at right angle to the axis $x'-x$ but which appear to coincide in the projection which is illustrated in FIG. 2. These two circles are described in the same direction, but $B_1$ and $B_2$ are constantly displaced by M relatively to each other.

It is apparent that the link-arms 10a and 10a bis exert a torque which tends to prevent the rotation of the wheel 3a. This torque is produced by the tangential components $R_2$, $R_2$ bis of the thrust-bearing reaction. The radial components of this action (not shown) are compensated if the tightening of the link-arms is suitably regulated, said link-arms being endowed with a certain degree of flexibility.

It is clear that the movement of the inductor and the equilibrium of forces affecting this latter are the same as in the case of the armature. However, the inductor and armature are continuously in opposite-phase relationship The reaction of the roller track on the inductor is a force $G_2$ which is applied at the point of contact $T_2$ of the center $K_2$ with the circle $K_3$. The forces $G_1$ and $G_2$ generate a torque $2R_3G_1$ which is exerted on the roller track.

The inductor and the armature constitute equal masses which are subjected to circular translational movements which have equal radii and are in constantly opposite phase, with the result that the system is dynamically balanced.

As alternative form of construction, it would be possible to make use of an inductor and armature having different masses and to achieve dynamic balance by associating therewith two roller tracks having suitable and different diameters.

However, it should be pointed out that the balancing of the system is based on the symmetry of forces which are applied to the inductor and to the armature and between which the driving torque of the motor is virtually apportioned, with the result that the points of contact $T_1$ and $T_2$ are in fact diametrically opposite under the action of all the forces which are exerted on said inductor and said armature respectively.

The tension springs such as the springs 11a and 11b powerfully urge the armature against the inductor both axially and in rotation and therefore absorb any accidental axial thrust which may be produced, for example, as a result of a slight difference in diameter between the two wheels of the armature or of the inductor or as a result of a possible inequality in the torques of the armature and inductor which may result from a slight difference in diameter between the wheels of the armature and the wheels of the inductor.

Figure 3:
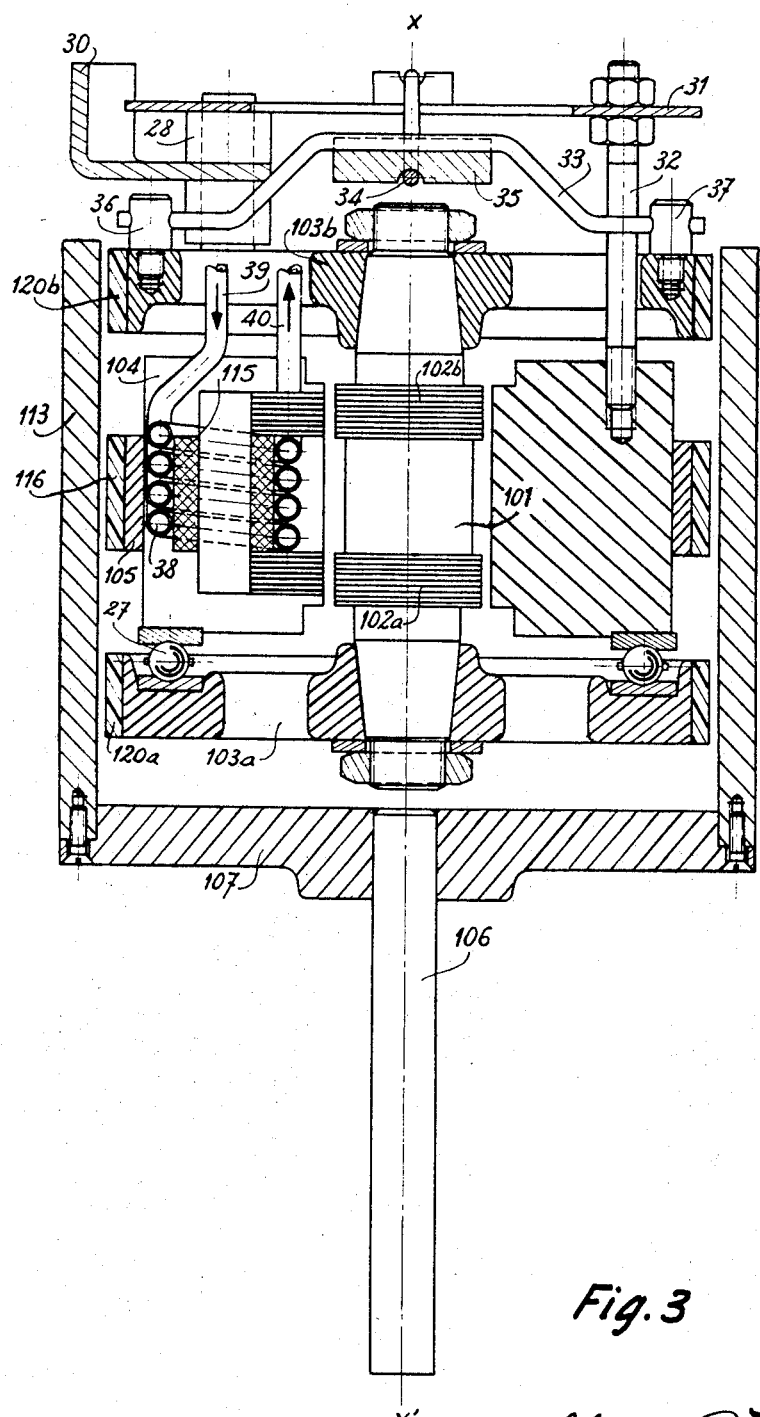
FIG. 3 is an axial sectional view of a preferred alternative form of construction of the motor.

IN FIG. 3, reference numerals higher by 100 than those of FIG. 1 serve to designate similar members, so that only members which are different from those of FIG. 1 need now be described.

From this figure, it can be seen that the inductor is entirely contained between the two wheels 103a and 103b of the armature and comprises only a single wheel 105 which takes up a central position on the axis $x'-x$ of the motor. This mode of construction is evidently simpler than that of FIG. 1.

In addition, a single roller track 113 forms a motion-transmission system and is secured to an end-shield 107 which is rigidly fixed to the shaft 106.

Said shaft 106 is rotatably mounted in bearings which are rigidly fixed to the motor frame, not known.

A ball thrust-bearing 27 which need merely comprise three grooved raceways ensures parallel alignment of the inductor and armature axes.

In accordance with a characteristic feature of this alternative form of construction, the coupling members which serve to couple the inductor and armature to the frame are separate from the stabilizing system.

Figure 4:
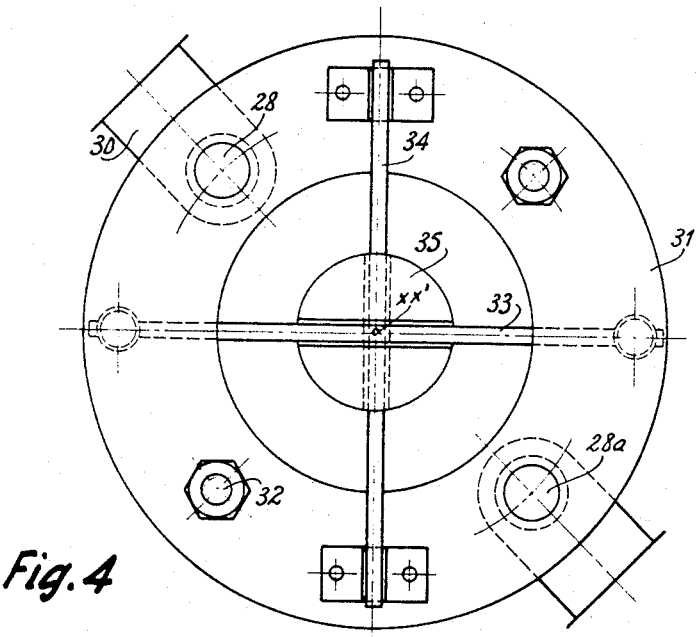
FIG. 4 is a view of the motor of FIG. 3, looking on the end.
Figure 6:
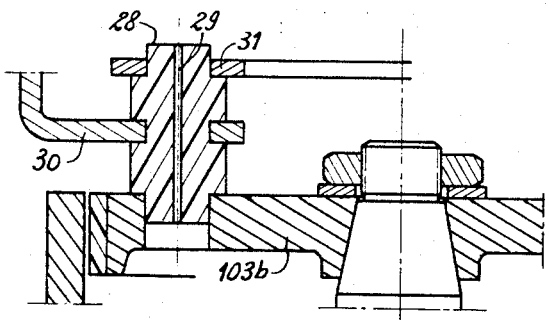

The transmission system (coupling members) is constituted by two rubber articulations 28 and 28a (as shown in FIG. 4). Each articulation is stiffened by a steel pin 29 and the central portion thereof is maintained securely fixed to the motor frame by means of a bracket 30. One end of the articulation 28 is applied against an annular member 31 which is secured to the inductor by means of threaded rods such as the rod 32 which are passed through slots formed in the wheel 103b (as shown in FIGS. 3 and 6).

The articulation 28 is mounted in a similar manner.

Figure 5:
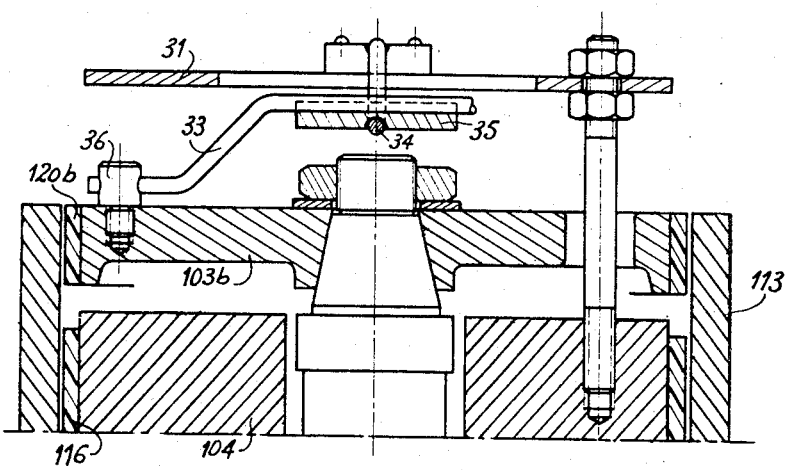
FIGS. 5 and 6 are detail views of the coupling members which are provided in the motor of FIG. 3.

The stabilizing system comprises two yokes 33 and 34, the ends of which are pivotally attached respectively to the wheel 103b (as shown in FIGS. 3 and 5) and to the member 31 (as shown in FIG. 4). The planes of said two yokes are at right angles to each other and the concave portions thereof are oriented in opposite directions in a manner similar to the interengaged ends of two contiguous chain-links.

The two yokes are not applied against each other (as in the case of two chain-links) but against an intermediate floating member 35 (as shown in FIGS. 3, 4 and 5) provided with cylindrical grooves in which are engaged with play the rectilineal portion formed at the top of each yoke.

The ends of the yoke 35 are thus pivotally mounted in the articulations 36–37 and the top of said yoke is pivotally engaged in the member 35. The yoke 34 is capable of performing similar pivotal movements.

In accordance with a characteristic feature of the invention, the motor is cooled by a circulation of water within a pipe which is wound around each of the coils of the inductor. The water is admitted at 39, circulated within a winding tube (not shown) along which heat is dissipated, then discharged at 40.

The operation of the motor which is illustrated in FIG. 3, as is the case with the motor of FIG. 1, is essentially based on the principle of circular translational movements of small amplitude performed by the wheels of the armature and inductor with respect to the roller track 113, said circular translational movements being in opposite phase (balanced motor) and on the fact that the roller track is driven in rotation by the reaction torque.

The coupling system hereinabove described in reference to FIGS. 3, 4 and 6 ensures the transmission of the driving torque of the shaft by virtue of the fact that said system establishes a coupling between the inductor and armature during the movement of oscillation of these latter and is secured to the frame substantially at the midpoint of said movement of oscillation.

On the other hand, this system is not capable of preventing any relative movement of rotation of the inductor and the armature, and this function of stabilization is performed by the yokes 33 and 34. Said yokes permit the relative translational displacement of the inductor and armature but transmit from the inductor to the armature any torque which may result from accidental unbalance between these two members.

The complete assembly is so adjusted that the yoke is under slight mechanical tension in order to maintain the inductor firmly applied against the armature by means of the thrust-bearing 27.

Figure 7:
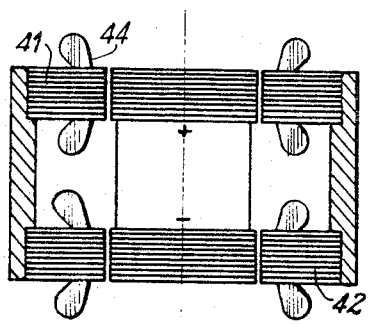
FIGS. 7 and 8 represent diagrammatically two alternative forms of construction of the magnetic circuit of the motor in accordance with the invention.

The alternative form of construction of the magnetic circuit which is illustrated in FIG. 7 is equivalent from the point of view of magnetic flux to the mode of construction which is shown in FIG. 1 and differs from this latter only insofar as concerns the practical design of the inductor.

Thus, the inductor is made up of two laminated-iron rings 41 and 42 which are set at both ends in a full annular frame 43 of magnetic material such as soft iron. Each ring is provided around its entire periphery with slots for accommodating windings such as 44, in the same manner as the inductor or field-coil unit of a conventional motor.

Figure 8:
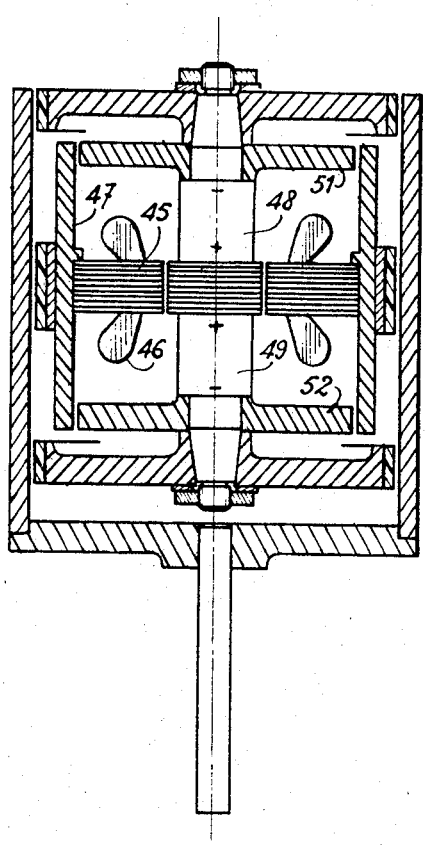

In the alternative form of construction of FIG. 8, the inductor comprises only one laminated-iron ring 45 which is cut out in such a manner as to accommodate windings such as 46 and which is set in a full annular frame 47. On the other hand, the armature comprises two magnets 48, 49 which are disposed symmetrically, so far as their polarities are concerned, with respect to a common laminated-iron pole-piece 50. The other pole-pieces of the magnets are made up of iron laminations or preferably, as shown in FIG. 8, of full wheels 51 and 52 of magnetic material such as soft iron.

This solution, which permits of economical execution since it calls for an inductor of conventional type from the point of view of laminations and windings, has a further advantage in that it makes it possible to endow the armature with a sufficient overall mass to obtain dynamic balancing of the motor.

As will be readily apparent, a large number of modifications could be made in the examples which have been described in the foregoing and illustrated in the accompanying drawings, without thereby departing either from the scope or the spirit of the invention.

What is claimed is:

1. A motor comprising a casing; an inductor within said casing, said inductor having a magnetic circuit; a generally cylindrical armature having at least one magnetic body for providing therein a constant radial magnetic field, said body having frontal surfaces, at least two generally circular magnetic circuit portions, associated with said inductor magnetic circuit and adjacent said frontal surfaces; at least one first roller located outwardly with respect to said circuit portions coaxial with said armature and rigidly connected thereto; at least one further roller coaxial with said armature and rigidly connected to said inductor; an output shaft journalled in said casing; at least one cup-shaped member rigidly connected to said output shaft, said cup-shaped members each having a rollway cooperating with said rollers; means for providing a rotary magnetic field in said magnetic circuit and coupling means connecting the rollers, the inductor and the casing together.

2. A motor comprising a casing; an inductor within said casing, said inductor having a magnetic circuit; a generally cylindrical armature having a magnetic body for providing therein a constant radial magnetic field, said body having frontal surfaces; two generally circular magnetic circuit portions, associated with said inductor magnetic circuit and adajacent said frontal surfaces; two first rollers located outwardly with respect to said circuit portions coaxial with said armature and rigidly connected thereto; two further rollers respectively located outwardly with respect to said first rollers coaxial with said armature and rigily connected to said inductor; an output shaft journalled in said casing; two cup-shaped member rigidly connected to said output shaft, said cup-shaped members each having a rollway cooperating with said rollers; means for providing a rotary magnetic field in said magnetic circuit and coupling means connecting the rollers, the inductor and the casing together; said coupling means including a plurality of link-arms, and respective bearing is connecting one end of each link-arm to the armature, the other end of each link-arm to the respective first roller and the center of each link-arm to the casing.

3. A motor as claimed in claim 1, wherein said first and further rollers substantially have the same diameter and the same weight.

4. A motor as claimed in claim 2, wherein said first and further rollers having facing wall portions each provided with a recess, said coupling means further comprising tension springs connecting the respective recesses of the said facing surface portions.

5. A motor comprising a casing; an inductor within said casing, said inductor having a magnetic circuit; a generally cylindrical armature having a magnetic body for providing therein a constant radial magnetic field, said body having frontal surfaces; two generally circular magnetic circuit portions, associated with said inductor magnetic circuit and adjacent said frontal surfaces; first and second rollers respectively located outwardly with respect to the respective circuit portions coaxial with said armature and rigidly connected thereto; a third roller coaxial with said armature and rigidly connected to said inductor in the center portion thereof; an output shaft journalled in said casing; a cup-shaped member rigidly connected to said output shaft, said cup-shaped member having a rollway cooperating with said rollers; means for providing a rotary magnetic field in said magnetic circuit; at least one articulation essentially consisting of a metal pin and a rubber sleeve wherein said pin is lodged, said articulation being connected at its central portion to said casing and at one end to said first roller; an annular member rigidly connected to the inductor, the other end of said articulation being connected to said annular member.

6. A motor as claimed in claim 5, further including a ball thrust-bearing mounted coaxial with said armature, said bearing connecting said second roller to said inductor.

7. A motor as claimed in claim 5, further including first and second yokes arranged at right angles with respect to each other, said first yoke having its ends pivotally attached to said first roller and said second yoke having its ends pivotally attached to said annular member.

8. A motor as claimed in claim 5, wherein the inductor includes a winding and a cooling water conduit-pipe wound around said winding.

References Cited
UNITED STATES PATENTS

| | | | |
|---|---|---|---|
| 2,857,536 | 10/1958 | Light | 310—82 |
| 2,871,382 | 1/1959 | Bouvier | 310—82 |
| 3,117,244 | 1/1964 | Rosain | 310—82 |
| 3,294,994 | 12/1966 | Anderson | 310—82 |

J. D. MILLER, *Primary Examiner.*